(12) United States Patent
Zhang et al.

(10) Patent No.: US 7,792,400 B1
(45) Date of Patent: Sep. 7, 2010

(54) OFF-AXIS FIBER OPTIC SLIP RING

(75) Inventors: Hong Zhang, Plainsboro, NJ (US);
Boying B. Zhang, Lawrenceville, NJ (US)

(73) Assignee: Princetel Inc., Pennington, NJ (US)

( * ) Notice: Subject to any disclaimer, the term of this patent is extended or adjusted under 35 U.S.C. 154(b) by 531 days.

(21) Appl. No.: 11/443,415

(22) Filed: May 11, 2006

(51) Int. Cl.
*G02B 6/26* (2006.01)

(52) U.S. Cl. .......................................... 385/26; 385/25

(58) Field of Classification Search .................. 385/25, 385/26
See application file for complete search history.

(56) References Cited

U.S. PATENT DOCUMENTS 5,568,578 A * 10/1996 Ames .......................... 385/34

* cited by examiner

*Primary Examiner*—Uyen-Chau N Le
*Assistant Examiner*—Chris H Chu

(57) ABSTRACT

A multi-channel off-axis optic slip ring system is disclosed. The invention eliminates the huge number of fiber bundles and photodiodes in most published patents. A couple of conventional optical components such as mirrors and prisms are used to transmit optical signals with high quality and low optic losses. The optical signal pick-up is realized through a pair of prisms mounted on gear transmission systems. It is a true passive, bi-directional rotational optical transmission device which could be used for both multi-mode and single mode fibers without the limitation to the through bore diameters.

16 Claims, 4 Drawing Sheets

OFF-AXIS FIBER OPTIC SLIP RING

REFERENCES CITED

U.S. Patent Documents

U.S. Pat. No. 4,460,242 July 1984 Birch, et al.

U.S. Pat. No. 4,492,427 January 1985 Lewis, et al.

U.S. Pat. No. 4,943,137 July 1990 Speer

U.S. Pat. No. 4,934,783 June 1990 Jacobson

U.S. Pat. No. 6,907,161 July 2005 Bowman

OTHER PUBLICATIONS

"Fiber Optic Rotary Joints-A Review", by GLENN F. I. DORSEY. *IEEE Trans. Components, Hybrids, and Manufac. Technol.*, vol. CHMT-5, NO. 1, 1982, PP39.

"Mechanism design, analysis and synthesis, volume 1" by Arthur G. Erdman and George N. Sandor. Third Edition. 1997.

BACKGROUND OF THE INVENTION

1. Field of the Invention

The invention is related to off-axis multi-channel fiber optic slip ring to provide transmission of data in optic form between a mechanically rotational interface with a through bore.

2. Description of Related Art

It is well known that the devices to transmit optical data between two independently rotational members are called fiber optical rotary joints, or optical slip ring. There are single channel, two channel and multi-channel fiber optical rotary joints. However, most of them are categorized as on-axis fiber optical rotary joint because the optical paths are located along the axis of rotation, or occupy the central space along the axis of rotation. If the central space along the rotational axis is not accessible, the optical light paths would not be allowed to path through the central area along the rotational axis. Such devices are usually called off-axis optical slip ring.

The simplest, off-axis slip ring has been described in U.S. Pat. No. 4,492,427, which comprises two opposed annular fiber bundles and increasing the number of such concentric annular bundles radially would make the device multi-channeled. The concentric, annular fiber bundle fiber optic slip rings are bi-directional but do have a modulated light loss dependent on the rotational angle. For minimizing the importance of the modulation, a digitized signal rather than an analog signal has to be used. This off-axis slip ring only could be used for multi-mode fibers, not single mode fibers.

U.S. Pat. No. 4,460,242 discloses an optical slip ring employing optical fibers to allow light signals applied to any one or all of a number of inputs to be reproduced at a corresponding number of outputs of the slip ring in a continuous manner. It includes a rotatable output member, a stationary input member and a second rotatable member which is rotated at half the speed of the output member like a de-rotator. The input member having a plurality of equispaced light inputs and the output member having a corresponding number of light outputs and the second rotatable member having a coherent strip formed of a plurality of bundles of optical fibers for transmitting light from the light inputs on the input member to the light outputs.

Another U.S. Pat. No. 4,943,137 assume the similar idea, where, a de-rotating, transmissive intermediate optical component with an array of lensed optical transmitters and receivers respectively mounted on the rotor and stator. The derotating, intermediate optical component comprises an image conduit, image transporter, or coherent optical fiber bundle of close-packed monofibers or multifibers.

But actually, it is almost no way to handle and arrange so many fibers on the said rotatable members, especially for large diameter slip ring. The optical loss is very obvious for multi-mode fibers. It is almost impossible to use single mode fibers. The effect of damaged fibers, the presence of debris, separation distances, component tolerances, or backlash in the gearing also cause problems.

A more sophisticated approach can be found in U.S. Pat. No. 6,907,161. The patent uses multiple inputs and pick-ups to send and receive data across members that have large diameters. The use of multiple inputs and pick-ups is required to keep the optical signals at a level that is sufficiently high to permit the photodiode receivers to operate. Wave guides are employed. The multiple inputs and pick-ups also cause a rapid rise and fall of the signal because the signal reflects from one area of the waveguide to another. The drawback is to use photodiode receivers which is an electro-optical device, so that the output signal is electrical and the power must be high. Besides, there is a time jitter thus limiting the data rate.

SUMMARY OF THE INVENTION

The object of the present invention is to eliminate the huge number of fiber bundles and photodiodes in most prior arts, to provide a true passive, bidirectional, no time jitter, low-loss off-axis optic slip ring which could be used for both multi-mode and single mode fibers.

DETAILED DESCRIPTION OF THE INVENTION

Figure 1:
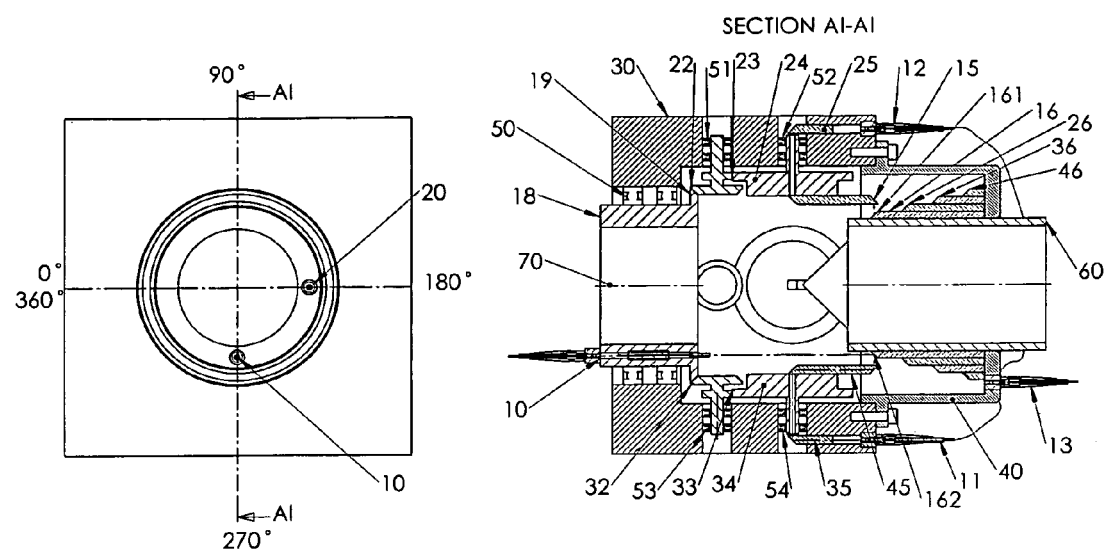
FIG. 1 is preferred embodiment of the invention.

As shown in FIG. 1, a typical embodiment of a multi-channel off-axis optic slip ring in the present invention comprises rotor 18, stator 30, mirror array 16, 26, 36, 46, rhomboid prisms 15, 45, right angle prisms 25,35, gears 19,22, 23,24, collimators 10, 20, 11, 12, and coupler 13. A pair of bearings 50 are mounted between rotor 18 and stator 30 to provide the main rotational interface. Other bearings 51, 52, 53, and 54 are used to rotationally support the gears 22, 23, 24; 32, 33, and 34 in the stator 30. Collimators 10, 20, and more (depends on how many channel would be built), are mounted on rotor 18 in circumferential direction at a different distances to the common rotational axis 70. The axis of the collimators 10, and 20 are parallel to the main rotational axis 70. The rotor 18 and the mirror holder 60 are hollow along the said common rotational axis so that a through bore is provided, leaving the central part of the interface totally free.

Figure 3:
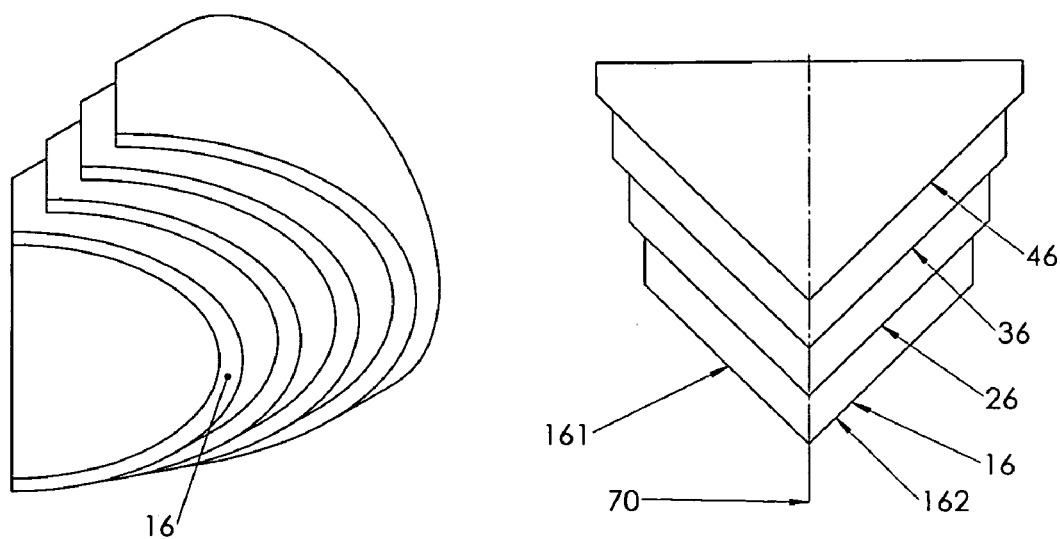
FIG. 3 shows the mirror array in the invention.

That means all the optical signals would not be allowed to pass through the through bore. On the inward end part of rotor 18 is a bevel gear 19, which is engaged with another bevel gear 32. A spur gear 33 is fixed with the bevel gear 32 and rotatable through the bearings 53, thus driving the next spur gear 34 to rotate through the bearings 54. A rhomboid prism 45 is attached on the gear 34 thus rotating with gear 34. A folded mirror 16 is co-axial with the common rotational axis 70 with two flat mirror surfaces 161 and 162, which are perpendicular each other and symmetrical to the common rotational axis (as shown in FIG. 3). The mirror array 16, 26, 36 and 46 are stationary by fixed to stator 30 through holder 60 and cover 40. The gear ratio between gear 19 and 34 is designed to 1:1. The rotation direction of the gear 34 is the same as that of rotor 18. When the collimator 10 rotates within 180° and 360°, the light beam emitted from collimator 10 will be reflected by the mirror surface 162 to rhomboid prism 45 and reflected two times by the paralleled surfaces of rhomboid prism 45 to the central hole of gear 34. Another similar right angle prism 35 fixed in the stator 30 would pickup the light beam to the collimator 11, which is also fixed on stator 30. Because the counterpart of the above described gears, rhomboid prisms, right angle prisms, and collimators are also symmetrically arranged to the common axis 70, when the collimator 10 rotates between 0° and 180°, the light beam emitted from collimator 10 will be reflected by mirror surface 161, prism 15 and 25, then coupled to collimator 12. Finally, the collimator 11 and 12 are connected to an optical coupler 13, which is also fixed to stator 30 through cap 40.

Figure 2:
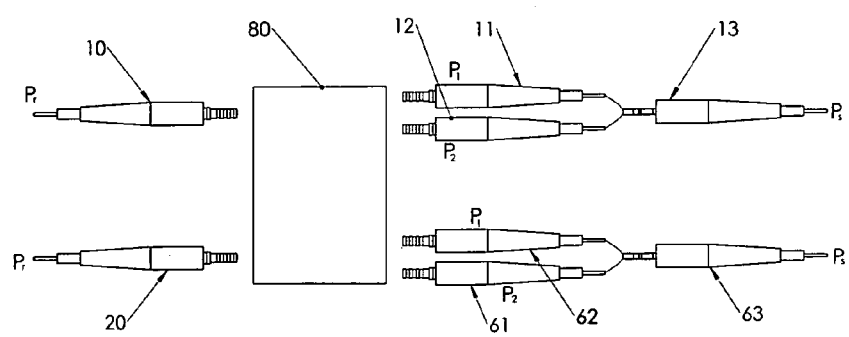
FIG. 2 is an outline diagram of the off-axis slip ring in FIG. 1.

FIG. 2 is an outline diagram of the off-axis slip ring in FIG. 1, where, member 80 represents the opto-mechanical transformer, including all the gears, rhomboid prisms, right angle prisms, mirrors and bearings. In the first channel, light beam would be transmitted from collimator 10 to coupler 13, vise versa. In the second channel, light beam would be transmitted from collimator 20 to coupler 63, vise versa, in the same way. Mirror 26 is for second channel (as shown FIG. 1, FIG. 3 and FIG. 4). The gears and prisms for the second channel are not shown in the FIG. 1, but they have the same opto-mechanical structure as the first channel. As illustrated in FIG. 2, if the power of optical signal from collimator 10 is $P_r$, and the power of optical signal through collimator 11 and 12 are $P_1$ and $P_2$ respectively, then the power of optical signal to coupler 13, $P_s$, can be expressed as follows:

$$P_s = \begin{matrix} P_2/2, \text{------}(0 \sim 180°) \\ P_1/2, \text{-----}(180° \sim 360°) \end{matrix},$$

where, $P_2 \approx P_r$, - - - (0~180°), $P_1 \approx P_r$, - - - (180°~360°), (Note: the Angle Refers to the Rotation Position of Rotor 18 in FIG. 1)

Due to the opto-mechanical transmission error, usually, $P_1 \neq P_2$, and $P_1 - P_2 \leq 1$ dB.

Figure 4:
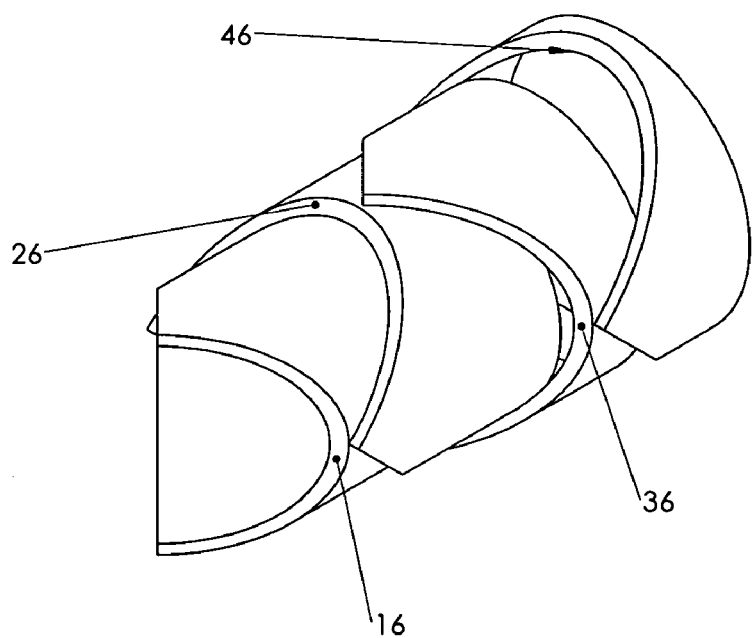
FIG. 4 illustrates another arrangement of the mirror array in the invention.

Another embodiment of mirror array is illustrated in FIG. 4 if the gear systems for the even number of channel are arranged to perpendicular to the odd number of channel. For example, mirror 16 is for channel one, mirror 36 for channel 3, mirror 26 and 46 for channel 2 and channel 4 respectively. In this way, the axis of gears for channel 1 and 3 would be perpendicular to the axis of gears for channel 2 and 4 in order to save space.

Figure 5:
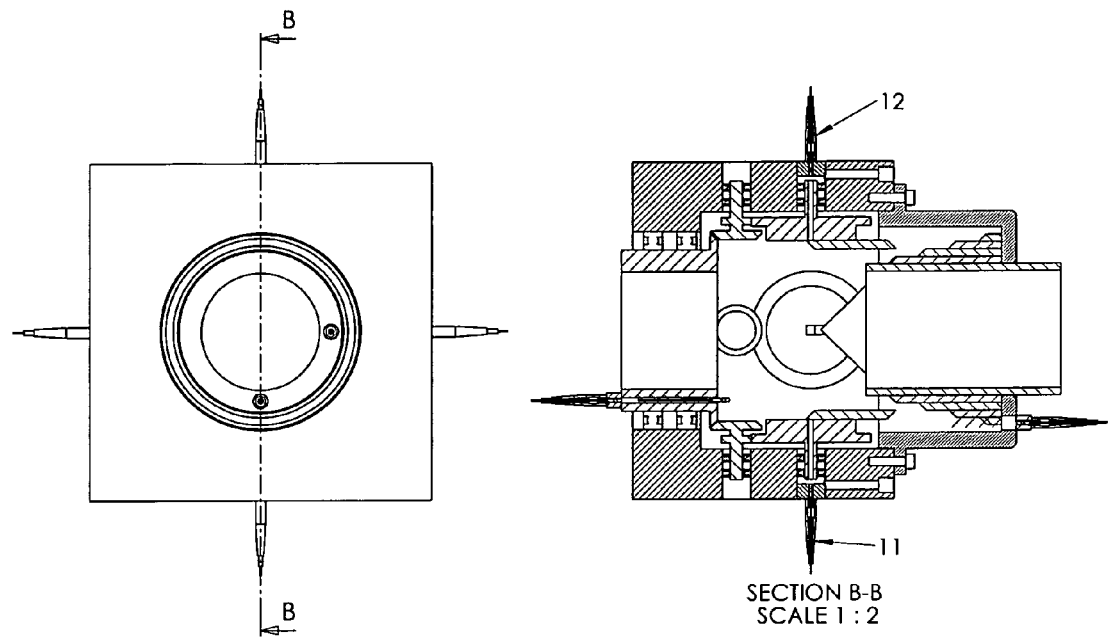
FIG. 5 represents the position changes for the collimators on stator.

In FIG. 5, the optical signals would be directly coupled to collimator 11 and 12 respectively instead of using right angle prisms 25 and 35 like in FIG. 1.

Figure 6:
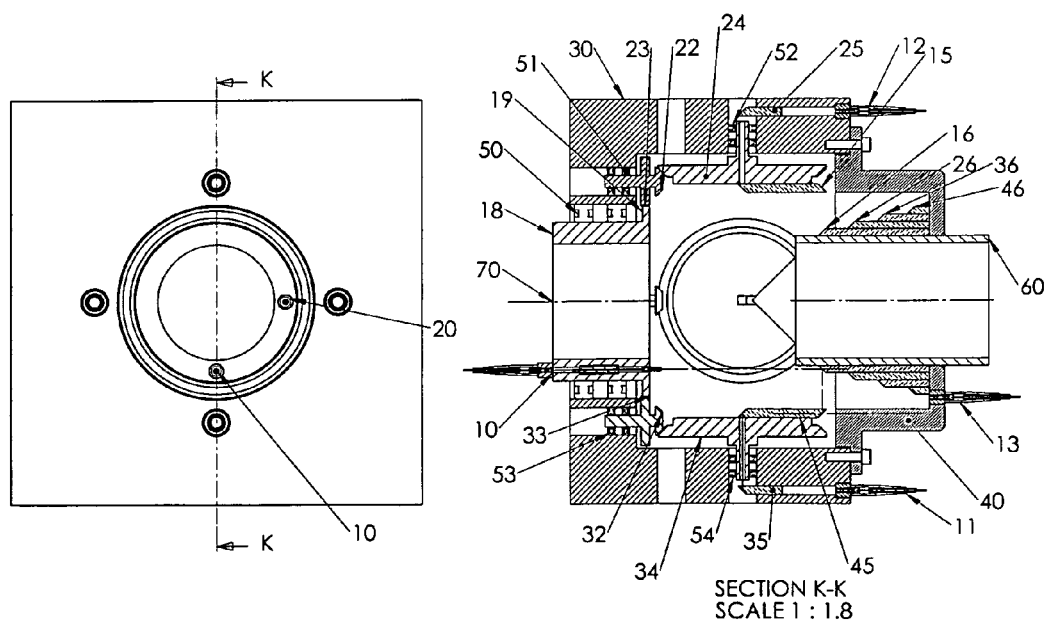
FIG. 6 shows another embodiment of the gear transmission in the invention.

An alternative embodiment of the invention is illustrated in FIG. 6, where the gear transmission is arranged in a different way as in FIG. 1. The gear engagement between 19 and 24, (or between 19 and 34), is in such an order as from spur gear to bevel gear, while in FIG. 1 it is from bevel gear to spur gear. The gear engagement order would not change the light path and the performance of the invention, but affect the mechanical dimensions of the invention.

Figure 7:
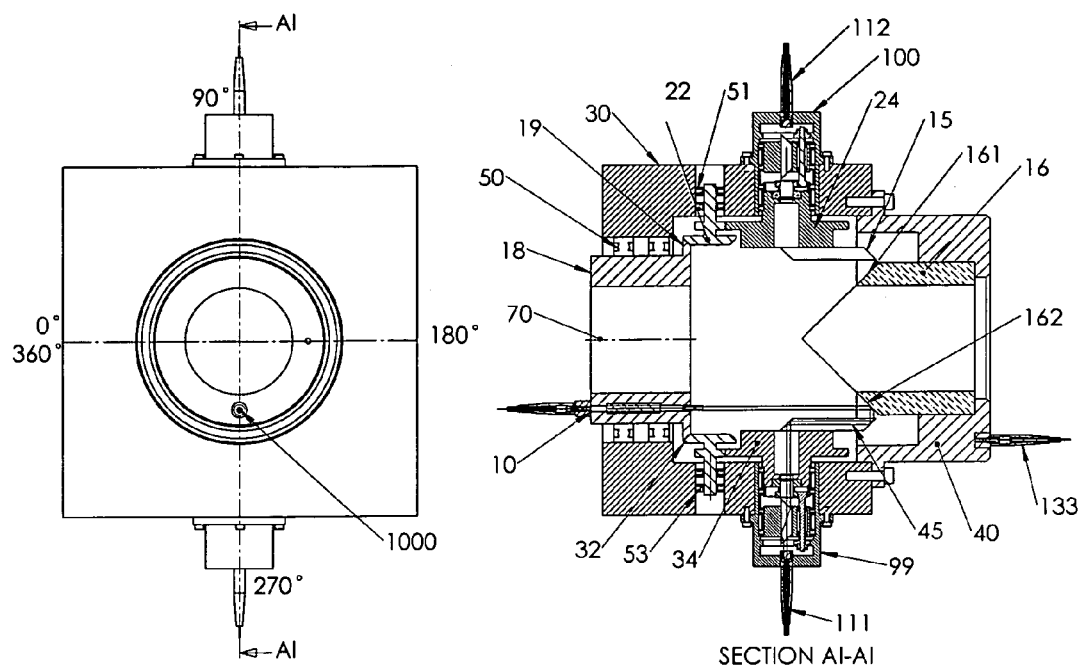
FIG. 7 demonstrates a different way to build a multi-channel off-axis optic slip ring.

In FIG. 7, a preferred embodiment of the invention for multi-channel off-axis fiber optic slip ring is illustrated, where, two on-axis multi-channel fiber optic rotary joints 99 and 100 are utilized. They are co-axially arranged with gear 34 and gear 24 respectively. To compare with FIG. 1 and FIG. 5, almost all the opto-mechanical members are the same in FIG. 7 as in FIG. 1 and FIG. 5, but only one mirror 16 is needed for this embodiment. The collimator 10 in FIG. 1 and FIG. 5 becomes a multi-collimator bundle 1000 in FIG. 7 in the same position on rotor 18. The collimator 11, or 12 in FIG. 1 and FIG. 5 becomes a multi-collimator bundle 111, or 112 in FIG. 7 in the similar position on stator 30. The multi-collimator bundle 1000 could transmit multi-channel optical signals. The light beams emitted from multi-collimator bundle 1000 should be parallel one another. For example, the paralleled light beams from the multi-collimator bundle 1000 would be reflected by the flat mirror surface 162, or 161, and then reflected two times by the rhomboid prism 45, or 15, to get into the central bore of the gear 34, or gear 24 along the rotational axis of gear 34, or gear 24. When the multi-collimator bundle 1000 rotates with the rotor 18 around the common rotational axis 70, the paralleled light beams from the multi-collimator bundle 1000 will rotate around the axis of gear 34, or gear 24, in a stable pattern after transmitted by the mirror 16 and rhomboid prism 45, or 15. The on-axis fiber optic rotary joint 99, or 100, will allow the rotating paralleled light beams from the multi-collimator bundle 1000 to be coupled with the multi-collimator bundle 111, 112, which is fixed to the stator 30. Like in FIG. 1 and FIG. 5, a coupler bundle 133 will couple the corresponding fibers from collimator bundle 111 and 112.

Figure 8:
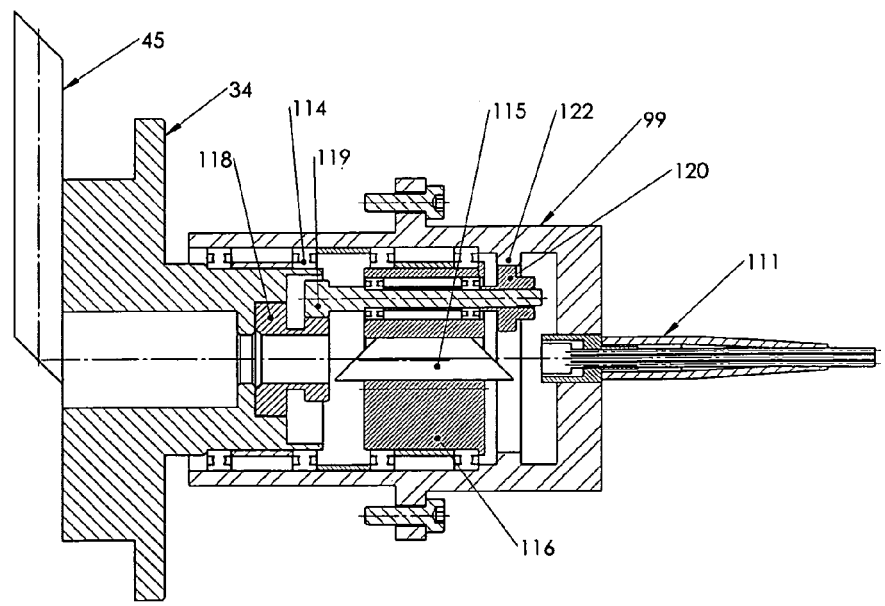
FIG. 8 is the enlarged view for an on-axis multi-channel optic rotary joint used in FIG. 7.

To explain how the on-axis fiber optic rotary joint (FORJ) 99, or 100 works, the cross section view of a preferred on-axis fiber optic rotary joint 99, or 100 is enlarged in FIG. 8. The gear 34, or 24, is also the rotor of FORJ. A sun gear 118 is fixed with rotor 34, which is engaged with planet gear 119, while another planet gear 120 is engaged with an internal gear 122, which is part of stator 99 of the FORJ. A Dove prism 115 is co-axially fixed inside the through bore of carrier 116. The planet gear system is such designed so that the carrier 116 will rotate at the half speed as that of the rotor 34 and in the same rotational direction. In this way, the rotating paralleled light beams on the rotor 34 will be coupled into corresponding collimators in the collimator bundle 111, or 112 after pass through the Dove prism.

The on-axis fiber optic rotary joint in FIG. 8 is only one typical on-axis fiber optic rotary join. Any other types of on-axis fiber optic rotary joint could be used in present invention in the same manner as the on-axis fiber optic rotary joints in FIG. 7.

The invention claimed is:
1. An off-axis fiber optic slip ring assembly for use with single mode and multi-mode optical fibers comprising:
a stator with a central through bore and a rotor with a central through bore, able to rotate independently of each other on a common axis through a pair of bearings;

a first fiber optical collimator mounted on said rotor and able to rotate with said rotor around said common axis;

a hollow mirror array, having a number of concentric cylindrical members with central through bore, fixed in said stator, coaxially orientated with said rotor at a specific distance from a first gear portion of the rotor;

rotor means having a concentric first gear on the inward end portion of the rotor;

a second gear engaging with said first gear, having a concentric shaft, able to rotate around the axis of said shaft in a bore of said stator through bearings;

a third gear concentrically attached on said second gear, able to rotate with said second gear;

a fourth gear engaging with said third gear, having a concentric shaft with a through bore, able to rotate around the axis of said shaft in a bore of said stator through bearings;

a first rhomboid prism attached on the inward end portion of said fourth gear radially, with one end portion of the rhomboid prism covering said through bore of said fourth gear on the inward side of said fourth gear;

a first right angle prism attached on said stator, parallel located with said first rhomboid prism with one end portion of the rhomboid prism covering said through bore of said fourth gear on the outward side;

a second fiber optical collimator fixed in a bore of said stator, coaxially aligned with said first right angle prism with a specific axial distance;

a fifth gear, sixth gear, and seventh gear being exactly the same gear as said second gear, third gear, and fourth gear respectively, and mounted in said stator in a symmetrical position to the said common axis through bearings;

a second rhomboid prism and second right angle prism being exactly same as said first rhomboid prism and first right angle prism respectively, and mounted in said stator in a symmetrical position to the said common axis;

a third fiber optical collimator fixed in a bore of said stator, coaxially aligned with said second right angle prism with a specific axial distance;

an optical coupler, fixed on the said stator, connected with said second and said third fiber optical collimator on one side.

2. An off-axis fiber optic slip ring assembly according to claim 1, wherein said hollow mirror array comprises a first channel cylindrical member, at least a second channel cylindrical member, each of the cylindrical members having at least two flat surfaces perpendicular to each other and forming a sharp edge perpendicular to said common axis, said flat surfaces being optically coated as first and second optical mirror surfaces.

3. An off-axis fiber optic slip ring assembly according to claim 1, wherein the axis of said fourth gear, and said seventh gear being perpendicular to said common axis.

4. An off-axis fiber optic slip ring assembly according to claim 1, wherein the axis of said second gear and said fifth gear being either parallel to said common axis, or perpendicular to said common axis.

5. An off-axis fiber optic slip ring assembly according to claim 1, wherein the optical signal could be emitted from said first collimator, when said rotor rotates from 0° to 180°, reflected by the first optical mirror surface of said cylindrical member, then reflected by said first rhomboid prism, after passing through the through bore of said fourth gear, reflected by said first right angle prism and get into said second collimator; and when said rotor rotates from 180° to 360°, the optical signal, reflected by said second optical mirror surface, then reflected by said second rhomboid prism, after passing through the through bore of said seventh gear, reflected by said second right angle prism and getting into said third collimator; each of said second collimator and third collimator optically connected to one side of said optical coupler; and said optical signal also could be emitted from said optical coupler, in an inverse way, getting into said first collimator.

6. An off-axis fiber optic slip ring assembly for use with single mode and multi-mode optical fibers comprising:

a stator with a central through bore and a rotor with a central through bore, able to rotate independently of each other on a common axis through a pair of bearings;

a first fiber optical collimator mounted on said rotor and able to rotate with said rotor around said common axis;

a hollow mirror array, having a number of concentric cylindrical members with central through bore, fixed in said stator, coaxially orientated with said rotor at a specific distance from a first gear portion of the rotor;

rotor means having a concentric first gear on the inward end portion of the rotor;

a second gear engaging with said first gear, having a concentric shaft, able to rotate around the axis of said shaft in a bore of said stator through bearings;

a third gear concentrically attached on said second gear, able to rotate with said second gear;

a fourth gear engaging with said third gear, having a concentric shaft with a through bore, able to rotate around the axis of said shaft in a bore of said stator through bearings;

a first rhomboid prism attached on the inward end portion of said fourth gear radially, with one end portion of the rhomboid prism covering said through bore of said fourth gear on the inward side of said fourth gear;

a second fiber optical collimator fixed in a bore of said stator, coaxially aligned with the axis of said fourth gear with a specific axial distance;

a fifth gear, sixth gear, and seventh gear being exactly the same gear as said second gear, third gear, and fourth gear respectively, and mounted in said stator in a symmetrical position to said common axis through bearings;

a second rhomboid prism being exactly the same as said first rhomboid prism, and attached on the inward end portion of said seventh gear radially, with one end portion of the rhomboid prism covering said through bore of said seventh gear on the inward side of the said seventh gear;

a third fiber optical collimator fixed in a bore of said stator, coaxially aligned with the axis of said seventh gear with a specific axial distance;

an optical coupler, fixed on said stator, connected with said second and said third fiber optical collimator on one side.

7. An off-axis fiber optic slip ring assembly according to claim 6, wherein said hollow mirror array comprises a first channel cylindrical member, at least a second channel cylindrical member, each of the cylindrical members having at least two flat surfaces perpendicular to each other and forming a sharp edge perpendicular to said common axis, said flat surfaces being optically coated as first and second optical mirror surfaces.

8. An off-axis fiber optic slip ring assembly according to claim 6, wherein the axis of said fourth gear, and said seventh gear being perpendicular to said common axis.

9. An off-axis fiber optic slip ring assembly according to claim 6, wherein the axis of said second gear and said fifth gear being either parallel to said common axis, or perpendicular to said common axis.

10. An off-axis fiber optic slip ring assembly according to claim 6, wherein optical signal could be emitted from said first collimator, when said rotor rotates from 0° to 180°, reflected by the first optical mirror surface of said cylindrical member, then reflected by said first rhomboid prism, after passing through the through bore of said fourth gear, get into said second collimator; and when said rotor rotates from 180° to 360°, the optical signal, reflected by said second optical mirror surface, then reflected by said second rhomboid prism, after passing through the through bore of said seventh gear, getting into said third collimator; each of said second collimator and third collimator optically connected to one side of said optical coupler; and the said optical signal also could be emitted from said optical coupler, in an inverse way, getting into said first collimator.

11. An off-axis fiber optic slip ring assembly for use with single mode and multi-mode optical fibers comprising:
- a stator with a central through bore and a rotor with a central through bore, able to rotate independently of each other on a common axis through a pair of bearings;
- a first fiber optical collimator array, including multi-channel optical collimators, mounted on said rotor and able to rotate with said rotor around said common axis;
- a hollow cylindrical member, fixed in said stator, coaxially orientated with said rotor at a specific distance from a first gear portion of the rotor;
- rotor means having a concentric first gear on the inward end portion of the rotor;
- a second gear engaging with said first gear, having a concentric shaft, able to rotate around the axis of said shaft in a bore of said stator through bearings;
- a third gear concentrically attached on said second gear, able to rotate with said second gear;
- a fourth gear engaging with said third gear, having a concentric shaft with a through bore, able to rotate around the axis of said shaft in a bore of said stator through bearings;
- a first rhomboid prism attached on the inward end portion of said fourth gear radially, with one end portion of the rhomboid prism covering said through bore of said fourth gear on the inward side of said fourth gear;
- a first on axis multi-channel fiber optical rotary joint mounted on said stator, coaxially aligned with said fourth gear and driven by said fourth gear;
- a second fiber optical collimator array, including multi-channel optical collimators, coaxially fixed with the second on-axis multi-channel fiber optical rotary joint;
- a fifth gear, sixth gear, and seventh gear being exactly the same gear as said second gear, third gear, and fourth gear respectively, and mounted in said stator in a symmetrical position to said common axis through bearings;
- a second rhomboid prism being exactly the same as the said first rhomboid prism, and attached on the inward end portion of said seventh gear radially, with one end portion of the rhomboid prism covering said through bore of said seventh gear on the inward side of said seventh gear;
- an second on-axis multi-channel fiber optical rotary joint mounted on said stator, coaxially aligned with the said seventh gear and driven by the said seventh gear;
- a third fiber optical collimator array, including multi-channel optical collimators, coaxially fixed with the second on-axis multi-channel fiber optical rotary joint;
- an optical coupler array, including multi-channel optical couplers, fixed on said stator, connected with the said second and said third fiber optical collimator on one side.

12. An off-axis fiber optic slip ring assembly according to claim 11, wherein said hollow cylindrical member comprises at least two flat surfaces perpendicular to each other and forming a sharp edge perpendicular to said common axis, said flat surfaces being optically coated as first and second optical mirror surfaces.

13. An off-axis fiber optic slip ring assembly according to claim 11, wherein the axis of said second gear, said fourth gear, said fifth gear, said seventh gear being perpendicular to said common axis.

14. An off-axis fiber optic slip ring assembly according to claim 11, wherein the axis of said second gear and said fifth gear being parallel to said common axis, while the axis of the said fourth gear and said seventh gear being perpendicular to said common axis.

15. An off-axis fiber optic slip ring assembly according to claim 11, wherein said on-axis multi-channel fiber optical rotary joint means an opto-mechanical device including at least a first member and a concentric second member relatively rotatable each other through bearings on a common axis forming a continuous rotary interface, able to pass optical signals on multiple, single-mode or multi-mode optical channels across said continuous rotary interface; said on-axis multi-channel fiber optical rotary joint concentrically orientated with said fourth gear, or seventh gear; one of said first member, or second member attached to said fourth gear, or said seventh gear and driven by said fourth gear, or said seventh gear, while another said first member, or second member attached to said stator.

16. An off-axis fiber optic slip ring assembly according to claim 11, wherein multi-channel optical signals could be emitted from said first collimator array, when said rotor rotates from 0° to 180°, reflected by the first optical mirror surface of said cylindrical member, then reflected by said first rhomboid prism, after passing through said on-axis multi-channel fiber optical rotary joint concentrically orientated with said fourth gear, getting into said second collimator array; and when said rotor rotates from 180° to 360°, the multi-channel optical signals, reflected by said second optical mirror surface, then reflected by said second rhomboid prism, after passing through said on-axis multi-channel fiber optical rotary joint concentrically orientated with said seventh gear, getting into said third collimator array; each of said second collimator array and third collimator array optically connected to one side of said optical coupler array; and said optical signals also could be emitted from said optical coupler array, in an inverse way, getting into the said first collimator array.

* * * * *